(12) United States Patent
Ogura et al.

(10) Patent No.: US 7,691,466 B2
(45) Date of Patent: Apr. 6, 2010

(54) HONEYCOMB STRUCTURE

(75) Inventors: Yutaka Ogura, Inazawa (JP); Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 924 days.

(21) Appl. No.: 11/474,323

(22) Filed: Jun. 26, 2006

(65) Prior Publication Data
US 2007/0009707 A1    Jan. 11, 2007

(30) Foreign Application Priority Data
Jul. 7, 2005    (JP)    ............... 2005-199209

(51) Int. Cl.
 B32B 3/12    (2006.01)
 B01D 39/14    (2006.01)
(52) U.S. Cl. .................... 428/116; 55/524
(58) Field of Classification Search .............. 428/116; 55/524
See application file for complete search history.

(56) References Cited

U.S. PATENT DOCUMENTS

| 5,629,067 A | 5/1997 | Kotani et al. |
| 6,361,693 B1 * | 3/2002 | Park .................. 210/321.89 |
| 2005/0025933 A1 | 2/2005 | Masukawa et al. |
| 2005/0095179 A1 | 5/2005 | Kasai et al. |
| 2006/0213163 A1 | 9/2006 | Taoka et al. |
| 2006/0217256 A1 | 9/2006 | Katoh |

FOREIGN PATENT DOCUMENTS

| EP | 1 486 242 A1 | 12/2004 |
| EP | 1 600 434 A1 | 11/2005 |
| EP | 1 704 920 A1 | 9/2006 |
| WO | WO 97/02414 | 1/1997 |
| WO | WO 2004/078674 A1 | 9/2004 |

OTHER PUBLICATIONS www.merriam-webster.com/dictionary/rectangle.*

* cited by examiner

Primary Examiner—Timothy M Speer
Assistant Examiner—Gordon R Baldwin
(74) Attorney, Agent, or Firm—Oliff & Berridge, PLC

(57) ABSTRACT

A honeycomb structure includes a honeycomb segment joined body comprising a plurality of honeycomb segments unitarily joined at joint faces thereof by means of a bonding material layer, and an outer peripheral coat layer, the honeycomb structure having a plurality of cells functioning as fluid passages disposed in parallel with one another in a central axis direction. A thickness of the outer peripheral coat layer at least at one portion of the portions (portions on end faces) located on end faces in longitudinal direction of the bonding material layer in a cross-section in a direction perpendicular to the central axis direction is larger than an average thickness of the portions other than the portions on end faces.

6 Claims, 4 Drawing Sheets

HONEYCOMB STRUCTURE

BACKGROUND OF THE INVENTION AND RELATED ART STATEMENT

The present invention relates to a honeycomb structure having a plurality of honeycomb segments unitarily joined by means of a bonding material layer. More specifically, the present invention relates to a honeycomb structure useful as a trapping filter for exhaust gas, particularly as a diesel particulate filter (DPF) for trapping particulate matter or the like contained in exhaust gas from a diesel engine, and capable of effectively inhibiting generation of defects such as cracks due to thermal stress by lightening an influence of thermal stress generated upon production.

A honeycomb structure is incorporated in an exhaust system or the like of a diesel engine as a trapping filter for exhaust gas, for example, as a diesel particulate filter (DPF) in order to trap and remove particulate matter contained in exhaust gas from a diesel engine or the like. Such a honeycomb structure has a problem of generating defects such as a crack due to thermal stress generated on an outer peripheral coat layer (particularly, in a portion located on an end face in the longitudinal direction of the bonding material layer in a cross-section in a direction perpendicular to a central axis direction). Though it can be considered to lower a cooling rate in order to reduce such defects, it is not the best measure since it lowers productivity.

Particularly, a honeycomb structure of silicon carbide is expected because it is excellent in thermal resistance. However, it has a high thermal expansion coefficient (high thermal stress generated) and low thermal shock resistance in comparison with a cordierite honeycomb structure, and the aforementioned problem is amplified. Further, remarkable increase in thermal stress caused in accordance with recent increase in size of a filter causes more serious generation of defects such as a crack more frequently to higher extent.

SUMMARY OF THE INVENTION

The present invention has been made in view of the above problem and aims to provide a honeycomb structure useful as a trapping filter for exhaust gas, particularly as a diesel particulate filter (DPF) for trapping particulate matter or the like contained in exhaust gas from a diesel engine, and capable of effectively inhibiting generation of defects such as cracks due to thermal stress by lightening an influence of thermal stress generated upon production.

In order to achieve the above aim, there is provided the following honeycomb structure according to the present invention.

[1] A honeycomb structure comprising:

a honeycomb segment joined body comprising a plurality of honeycomb segments unitarily joined at joint faces thereof by means of a bonding material layer, and an outer peripheral coat layer covering an outer peripheral surface of said honeycomb segment joined body, the honeycomb structure having a plurality of cells functioning as fluid passages disposed in parallel with one another in a central axis direction;

wherein a thickness of said outer peripheral coat layer at least at one portion of the portions (portions on end faces) located on end faces in longitudinal direction of the bonding material layer in a cross-section in a direction perpendicular to the central axis direction is larger than an average thickness of the portions other than the portions on end faces.

[2] A honeycomb structure according to the above [1], wherein a maximum thickness ($t_1$) in a portion (maximum portion) having the maximum thickness in the portions on end faces and the average thickness ($t_2$) in the portions other then the portions on end faces of said outer peripheral coat layer satisfy the relation of $(t_1) \geqq 2 \times (t_2)$.

[3] A honeycomb structure according to the above [1], wherein a maximum thickness ($t_1$) in a portion (maximum portion) having the maximum thickness in the portions on end faces and the average thickness ($t_2$) in the portions other then the portions on end faces of said outer peripheral coat layer satisfy the relation of $(t_1) \geqq (2 \text{ to } 40) \times (t_2)$.

[4] A honeycomb structure according to the above [1], wherein a thickness ($t_3$) of said outer peripheral coat layer at the four portions (portions on end faces in 90° directions) located in 90° direction with one another on end faces in longitudinal direction of the bonding material layer in a cross-section in a direction perpendicular to the central axis direction and the average thickness ($t_4$) in the portions other then the portions on end faces in 90° directions of said outer peripheral coat layer satisfy the relation of $(t_3) \geqq (2 \text{ to } 40) \times (t_4)$.

[5] A honeycomb structure according to any one of the above [1] to [4], wherein a cross-section, in a direction perpendicular to the central axis direction, of the honeycomb segments has a rectangular shape.

[6] A honeycomb structure according to any one of the above [1] to [5], wherein a cross-section, in a direction perpendicular to the central axis direction, of the honeycomb segment joined body has a shape of a circle, an ellipse, or a racetrack.

[7] A honeycomb structure according to any one of the above [1] to [6], wherein the honeycomb segments constituting the outer most periphery of the honeycomb structure do not have a crust having a pitch of 7 cells or more.

As described above, according to the present invention, there is provided a honeycomb structure useful as a trapping filter for exhaust gas, particularly as a diesel particulate filter (DPF) for trapping particulate matter or the like contained in exhaust gas from a diesel engine, and capable of effectively inhibiting generation of defects such as cracks due to thermal stress by lightening an influence of thermal stress generated upon production.

DETAILED DESCRIPTION OF THE PREFERRED EMBODIMENTS

Figure 3:
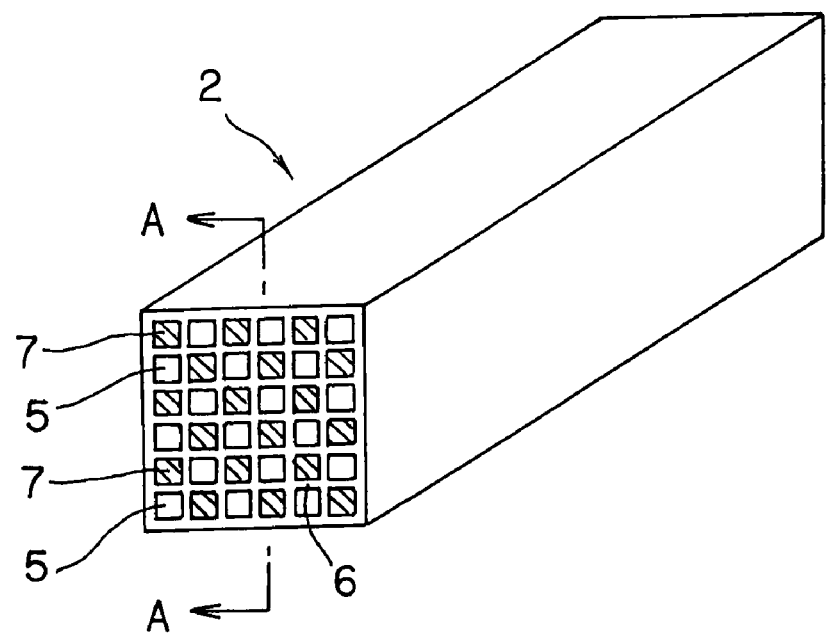
FIG. 3 is a perspective view schematically showing a honeycomb segment used in another embodiment of a honeycomb structure of the present invention.
Figure 4:
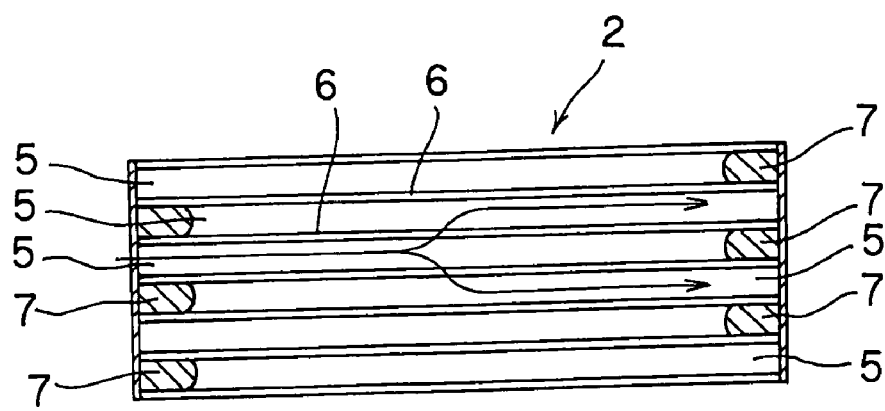
FIG. 4 is a cross-sectional view along the A-A line in FIG. 3.
Figure 5:
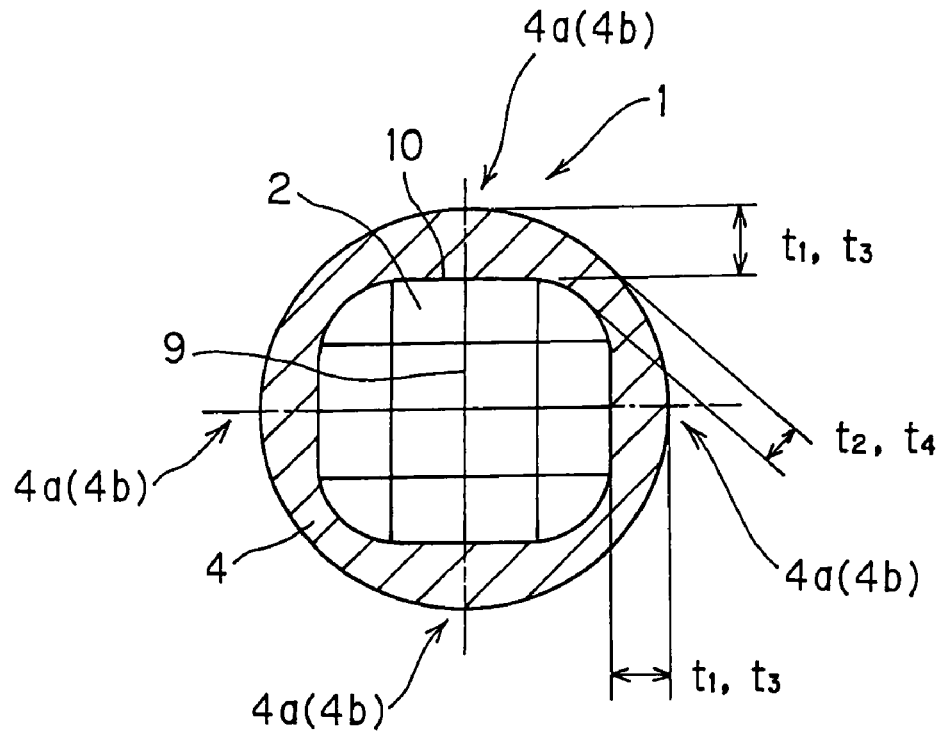
FIG. 5 is a cross-sectional view schematically showing the difference in thickness depending on portions of the outer peripheral coat layer in an embodiment (A cross-section of the honeycomb segment joined body has an almost square shape.) of a honeycomb structure of the present invention.
Figure 6:
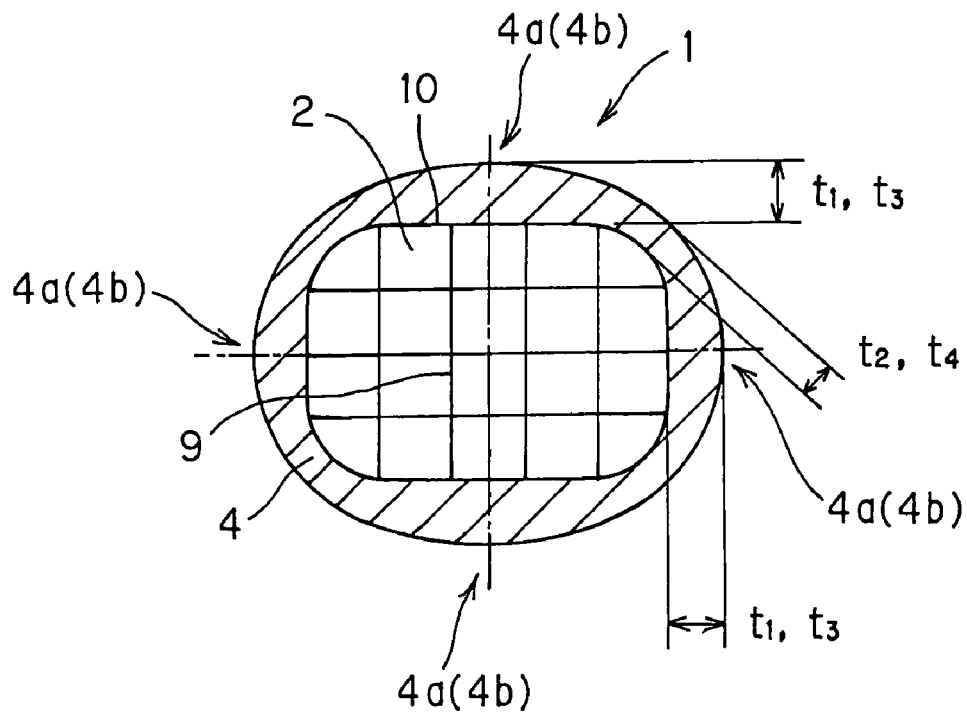
FIG. 6 is a cross-sectional view schematically showing the difference in thickness depending on portions of the outer peripheral coat layer in an embodiment (A cross-section of the honeycomb segment joined body has an almost rectangular shape.) of a honeycomb structure of the present invention.
Figure 7:
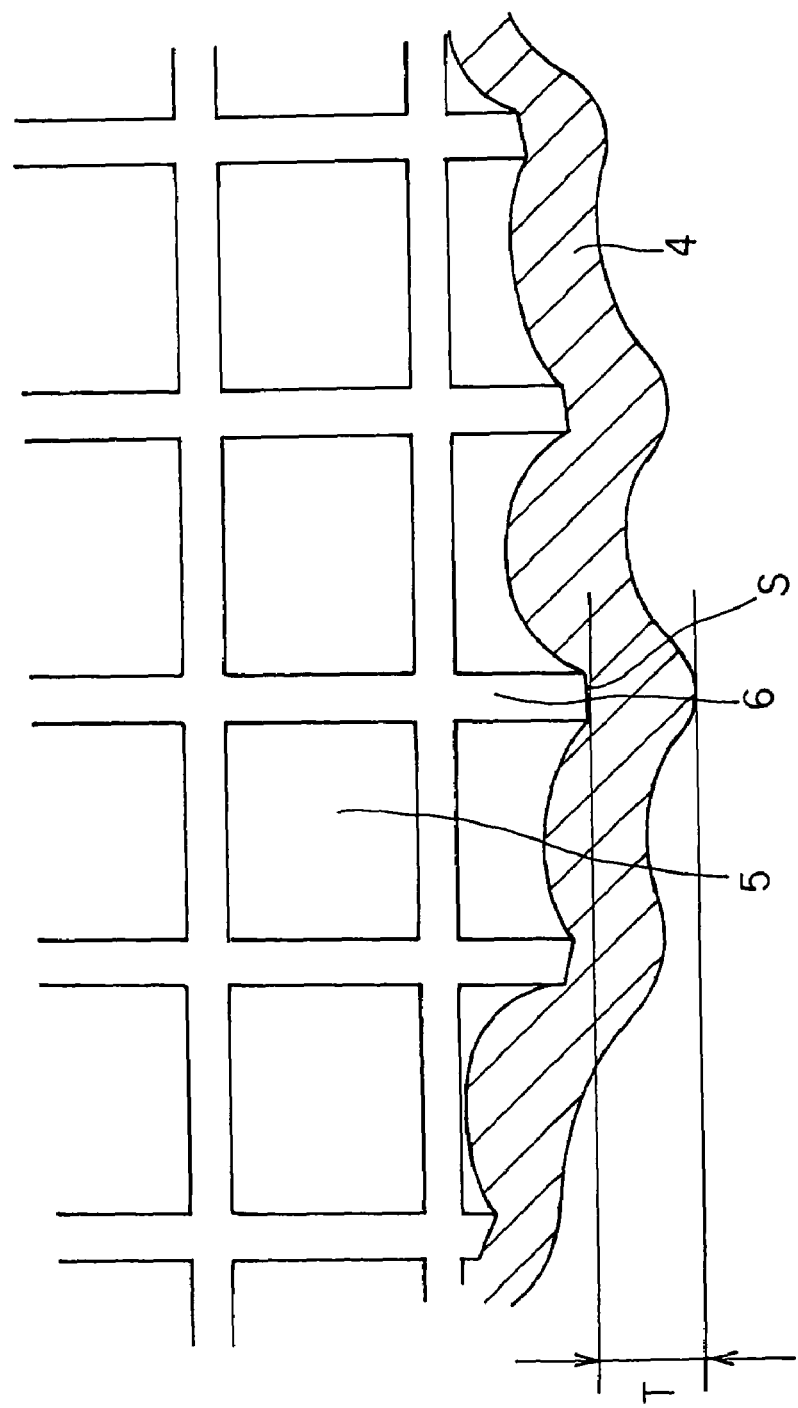
FIG. 7 is a cross-sectional view schematically showing the definition of thickness of the outer periphery coat layer in an embodiment of a honeycomb structure of the present invention.

As shown in FIGS. 1 to 4, a honeycomb structure 1 is a honeycomb structure 1 including a honeycomb segment joined body 10 comprising a plurality of honeycomb segments 2 unitarily joined at joint faces thereof by means of a bonding material layer 9, and an outer peripheral coat layer 4 covering an outer peripheral surface of said honeycomb segment joined body 10. As shown in FIGS. 5 and 6 (FIG. 5 shows a case that a cross-section of the honeycomb segment joined body 10 has an almost square shape, and FIG. 6 shows a case that a cross-section of the honeycomb segment joined body 10 has an almost rectangular shape), it is characterized in that a thickness of the outer peripheral coat layer 4 at least at one portion of the portions (portions on end faces) 4A located on end faces in longitudinal direction of the bonding material layer 9 in a cross-section in a direction perpendicular to the central axis direction is larger than an average thickness of the portions other than the portions 4A on end faces. To be concrete, a maximum thickness $(t_1)$ in a portion (maximum portion) having the maximum thickness in the portions 4A on end faces and the average thickness $(t_2)$ in the portions other then the portions on end faces of the outer peripheral coat layer 4 preferably satisfy the relation of $(t_1) \geq 2 \times (t_2)$. In addition, a maximum thickness $(t_1)$ in a portion (maximum portion) having the maximum thickness in the portions 4A on end faces and the average thickness $(t_2)$ in the portions other then the portions 4A on end faces of the outer peripheral coat layer 4 further preferably satisfy the relation of $(t_1) \geq (2$ to $40) \times (t_2)$, and particularly preferably satisfy the relation of $(t_1) \geq (15$ to $25) \times (t_2)$. Here, thickness of the outer peripheral coat layer 4 means a "distance T from the tip portion S of a partition wall in contact with the outer peripheral coat layer 4 to a surface of the outer peripheral coat layer 4 as shown in FIG. 7 in the case that the honeycomb segments 2 do not have a crust. In the case that the honeycomb segments 2 have a crust, it means a "distance from a surface of a crust (not illustrated) of a honeycomb segment in contact with the outer peripheral coat layer 4 to a surface of outer peripheral coat layer though it is not illustrated. In addition, the average thickness $(t_2)$ means the "average value of the values measured at 12 points at regular intervals in portions other than the portions 4A on an end face having the maximum thickness $(t_1)$ of the outer peripheral coat layer.

In the present invention, when $(t_1)$ is below twice $(t_2)$, many defects such as cracks are sometimes generated in the outer peripheral coat layer. When $(t_1)$ is above 40 times $(t_2)$, productivity is sometimes lowered remarkably, or the outer peripheral coat layer formed sometimes peels off partially.

In the present invention, as shown in FIGS. 5 and 6, a thickness $(t_3)$ of said outer peripheral coat layer at the four portions (portions on end faces in 90° directions) located in 90° direction with one another on end faces in longitudinal direction of the bonding material layer in a cross-section in a direction perpendicular to the central axis direction and the average thickness $(t_4)$ in the portions other then the portions on end faces in 90° directions of the outer peripheral coat layer preferably satisfy the relation of $(t_3) \geq (2$ to $40) \times (t_4)$, more preferably satisfy the relation of $(t_3) \geq (15$ to $25) \times (t_4)$.

Here, the average thickness $(t_3)$ means the average value of thickness of the outer peripheral coat layer on the end face portions 4B located in 90° directions with one another in a cross-section in a direction perpendicular to a central axis direction, and the average thickness $(t_4)$ means the average value of values measured at 12 points at regular intervals in portions other than the portions 4B on an end face. When $(t_3)$ is below twice $(t_4)$, many defects such as cracks are sometimes generated in the outer peripheral coat layer. When $(t_3)$ is above 40 times $(t_4)$, productivity is sometimes lowered remarkably, or the outer peripheral coat layer 4 formed sometimes peels off partially. In the present invention, the outer peripheral coat layer 4 is constituted so that a layer thickness in portions 4A on end faces and portions 4B on end faces located in 90° directions is larger than a thickness in the other portions. This is because it has high probability of causing defects such as cracks by the influence of thermal stress in these portions, and it is to improve thermal shock resistance in these portions.

In the present invention, it is preferable that wherein the honeycomb segments 2 constituting the outermost periphery of the honeycomb structure 1 do not have a crust having a pitch of 7 cells or more. It is more preferable that the crust on the outermost peripheral surface has a pitch of 3 cells or less, and it is particularly preferable that the honeycomb segments 2 do not have any crust on the outermost peripheral surface at all. When the honeycomb segments 2 constituting the outermost periphery of the honeycomb structure 1 have a crust on the outermost peripheral surface thereof, it inhibits the cell structure from firmly bonding with the outer peripheral coat layer 4 directly. Therefore, bonding strength in this portion is low. When a thickness of the crust on the outermost peripheral surface is above 7 cell pitch, an effect of thickening the outer peripheral coat layer 4 adjacent to this portion is not sufficiently exhibited occasionally.

Figure 1:
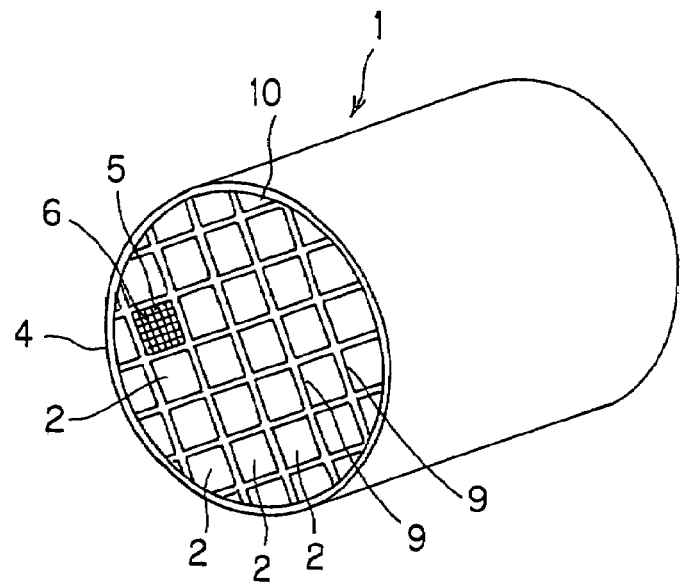
FIG. 1 is a perspective view schematically showing an embodiment (A whole cross-section along a plane perpendicular to the central axis has a circular shape.) of a honeycomb structure of the present invention.

A structure of a honeycomb structure 1 in an embodiment of the present invention will be described more concretely. A honeycomb structure 1 in an embodiment of the present invention is constituted by a honeycomb segment joined body 10 having a plurality of honeycomb segments 2 each having a structure having a plurality of cells 5 functioning as fluid passages separated and formed by porous partition walls 6 disposed in parallel with one another in a central axis direction, the honeycomb segments 2 being unitarily joined by means of a bonding material layer 9, and an outer peripheral coat layer 4 covering an outer peripheral surface of the honeycomb segment joined body 10. After the honeycomb segments 2 are joined by means of a bonding material layer 9, a grinding process is conducted to give the whole cross-section along a plane perpendicular to the central axis of the honeycomb structure 1 a shape of a circle, an ellipse, a racetrack, or a partially transformed shape thereof. Then, the outer peripheral surface is covered with an outer peripheral coat layer 4. When the honeycomb structure 1 is used as a DPF, particulate matter containing soot discharged from a diesel engine can be trapped by arranging the honeycomb structure in an exhaust gas system, or the like, of the diesel engine. In FIG. 1, cells 5 and partition walls 6 are shown only in one honeycomb segment 2. As shown in FIGS. 3 and 4, each of the honeycomb segments 2 has a shape for constituting a part of the whole structure of the honeycomb structure 1 (honeycomb segment joined body 10) (see FIG. 1), and the honeycomb segments 2 are combined with one another in a direction perpendicular to the central axis of the honeycomb structure 1 (see FIG. 1) to constitute the whole structure. The cells 5 are disposed in parallel with one another in the central axis direction of the honeycomb structure 1, and each of the end portions of the adjacent cells 5 are alternately plugged with a filler 7.

Figure 2:
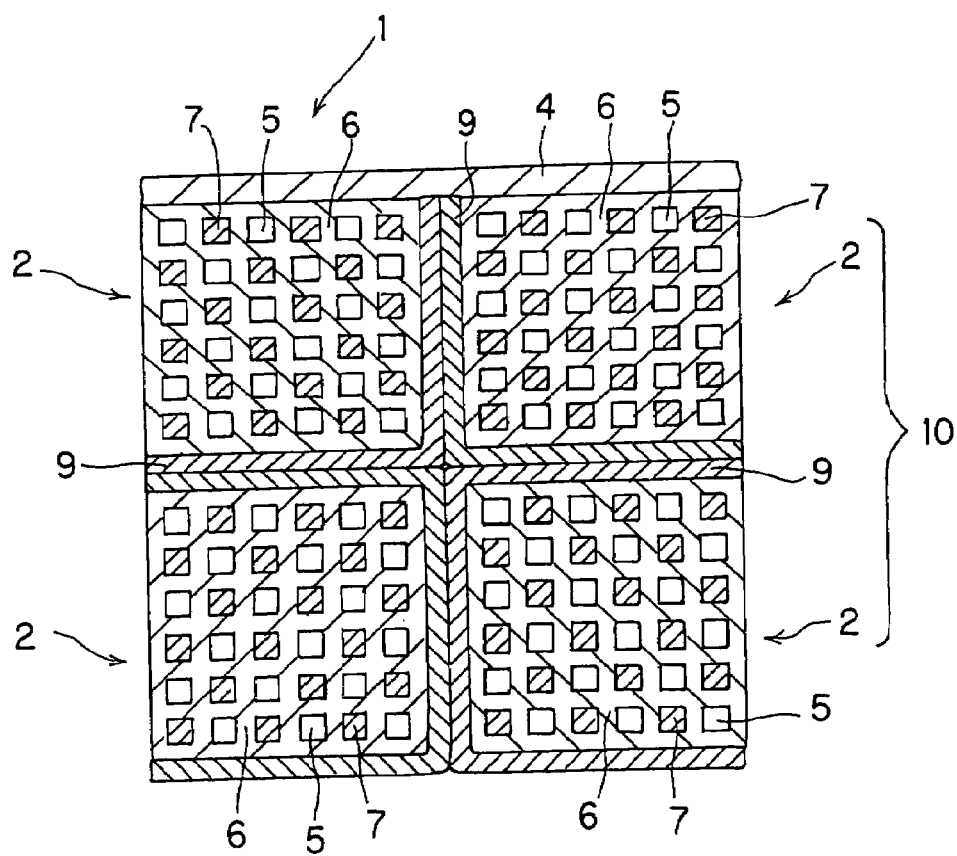
FIG. 2 is a front view, from an end face, of a part of another embodiment (A whole cross-section along a plane perpendicular to the central axis has a square shape.) of a honeycomb structure of the present invention.

In the FIGS. 3 and 4, each of predetermined cells 5 (inflow cells) has an opened end portion on its left, while each of the other cells 5 (outflow cells) adjacent to inflow cells has a closed end portion plugged with the filler 7 on its left and an opened end portion on its right. Such plugging gives each of the end faces of the honeycomb segments 2 a checkerwise pattern as shown in FIG. 2. When a honeycomb structure 1 having a plurality of such honeycomb segments 2 is arranged in an exhaust gas system for exhaust gas, exhaust gas flows into each of the honeycomb segments 2 from the left side in FIG. 4 and moves toward the right side.

FIG. 4 shows the case of the exhaust gas inlet port located on the left of the honeycomb segment 2, where exhaust gas flows into the honeycomb segment 2 from opened cells 5 (inflow cells) without being plugged. The exhaust gas flowed into the cells 5 (inflow cells) passes through porous partition walls 6 and flow out from the other cells 5 (outflow cells). When the exhaust gas passes through the partition walls 6, particulate matter containing soot in the exhaust gas is trapped in the partition walls 6. Thus, exhaust gas can be purified. Since a pressure loss increases because particulate matter containing soot accumulates in the course of time inside the honeycomb segments 2 due to such trapping, regeneration is conducted by combusting soot or the like. Though FIGS. 2 to 4 show honeycomb segments 2 each having a square whole cross-section, the shape may be a square, partially transformed square, triangle, hexagon, or the like. A cross-sectional shape of a cell 5 may be a polygon, circle, ellipse, racetrack shape, or partially transformed shape thereof.

A material for the honeycomb segments 2 is preferably at least one kind selected from the group consisting of silicon carbide, silicon-silicon carbide based composite material, silicon nitride, cordierite, mullite, alumina, spinel, silicon carbide-cordierite based composite material, silicon-silicon carbide composite material, lithium aluminum silicate, aluminum titanate, and Fe—Cr—Al based metal from the viewpoint of strength and thermal resistance. Of these, silicon carbide or silicon-silicon carbide based composite material is preferable.

The honeycomb segment 2 can be produced, for example, by adding to one selected from the above materials a binder such as methyl cellulose, hydroxypropoxyl cellulose, hydroxydiethyl cellulose, carboxymethyl cellulose, and polyvinylalcohol, a surfactant, water as a solvent, and the like, to prepare clay having plasticity; subjecting the clay to extrusion forming to give the aforementioned shape; drying the extruded body with microwaves, hot air, or the like; followed by sintering. In the present invention, the honeycomb segment 2 preferably has a thermal expansion coefficient of $1 \times 10^{-6}/°$ C. or more. When it is below $1 \times 10^{-6}/°$ C., a large amount of thermal stress is generated with thermal shock resistance being deteriorated, which sometimes increases occurrence of a defect such as a crack in the outer peripheral wall.

As a filler 7 used for plugging the cells 5, a material similar to that of the honeycomb segment 2 can be used. Plugging with the filler 7 can be conducted by filling slurried filler 7 into the opened cells 5 by immersing an end face of the honeycomb segment with the cells 5 not requiring plugging being masked. Though the filling of the filler 7 may be conducted either before firing or after firing after forming of the honeycomb segment 2, it is preferably conducted before firing because it requires only one firing step.

After production of the honeycomb segment 2 as described above, a slurried bonding material layer 9 is applied on the outer peripheral surface of the honeycomb segment 2. A plurality of honeycomb segments 2 are combined to give a predetermined solid shape (whole structure of the honeycomb structure 1) and subjected to press fitting, followed by drying by heating. Thus, a joined body having a plurality of honeycomb segments 2 unitarily joined with one another can be manufactured. Then, the joined body is subjected to grinding processing to give the aforementioned shape, and the outer peripheral surface is covered with an outer peripheral coat layer 4, followed by drying by heating. Thus, a honeycomb structure 1 shown in FIG. 1 is manufactured.

The bonding material layer 9 used in the present invention is applied on the outer peripheral surface of the honeycomb segments 2 so as to bond the honeycomb segments 2 with one another. Though the bonding material layer 9 may be applied on the outer peripheral surface of each of the honeycomb segments 2, it may be applied on only one of the corresponding outer peripheral surfaces between adjacent honeycomb segments 2.

Such application on only one of the corresponding surfaces is preferable in that an amount of the bonding material layer 9 can be saved. Thickness of the bonding material layer 9 is determined in consideration of bonding force between honeycomb segments 2 and suitably selected within the range from 0.2 to 4.0 mm, for example.

The bonding material layer 9 used in the present invention preferably contains ceramic as the main component and a granular filler. The bonding material layer 9 and the outer peripheral coat layer 4 can use the same material. Examples of the ceramic contained as the main component in the bonding material layer 9 and the outer peripheral coat layer 4 in the present embodiment include silicon carbide, silicon nitride, cordierite, alumina, and mullite. The material may contain a colloidal sol such as colloidal silica and colloidal alumina and, as necessary, metal fibers and a pore former besides the ceramic as the main component.

The outer periphery coat layer 4 is applied on the outer peripheral surface of the honeycomb segment joined body 10 to function as a protector for the outer peripheral surface of the honeycomb segment joined body 10. Thickness of the outer peripheral coat layer 4 is suitably selected, for example, within the range from 0.1 to 1.5 mm.

A granular filler contained in the bonding material layer 9 and the outer peripheral coating layer 4 may be made of inorganic or organic material. Examples of the inorganic material include glass beads and fly ash balloon. Examples of the organic material include starch and foaming resin.

The granular filler preferably has an average diameter of 10 to 300 µm, more preferably 15 to 250 µm, and particularly preferably 20 to 200 µm. In the granular filler, the ratio of the length of the longer central axis to that of the shorter central axis is preferably 1.0 to 4.0, and more preferably the granules are right spherical. The granular filler is contained in the bonding material layer 9 and the outer peripheral coating layer 4 at the rate of preferably 20 to 70% by volume, more preferably 25 to 65% by volume, and particularly preferably 30 to 60% by volume. The granular filler preferably has a hollow structure. By using granules having a hollow structure (hollow granules, density in a joint portion and the outer peripheral surface formed by curing the bonding material layer 9 and the outer peripheral coating layer 4 is lowered, and the Young's modulus can be lowered. This improves thermal shock resistance of the joint portion and the outer peripheral surface, and cracks are inhibited from being generated upon use.

The bonding material layer 9 and the outer peripheral coating layer 4 may further contain at least one kind selected from the group consisting of inorganic particles, oxide fibers, and colloidal oxides at the rate of 5 to 60% by mass in addition to the above ceramic and granular filler. By containing them, the bonding material layer 9 and the outer peripheral coating layer 4 can have improved properties. Examples of the inorganic particles include at least one ceramic selected from the group consisting of silicon carbide, silicon nitride, cordierite, alumina, mullite, zirconia, zirconium phosphate, aluminum titanate, and titania; Fe—Cr—Al based metals; nickel based metals; metal Si; and SiC. Examples of the oxide fibers include aluminosilicate fiber, and other fiber. Examples of the colloidal oxides include silica sol and alumina sol.

The bonding material layer 9 and the outer peripheral coating layer 4 preferably has a thermal conductivity of 0.1 to 5.0 W/m·k. It is preferable that a thermal expansion coefficient of the bonding material layer 9 and the outer peripheral coating layer 4 is relatively low in order to inhibit cracks from being generated due to thermal shock, or the like, and the preferable range is from $1 \times 10^{-6}$ to $8 \times 10^{-6}$/° C.

EXAMPLE

The present invention will hereinbelow be described more concretely with referring to Examples. However, the present invention is by no means limited to these Examples.

this case, the maximum thickness ($t_1$) of the outer peripheral coating layer was twice the average thickness ($t_2$) in the portions other than the portion having the maximum thickness.

Examples 2 to 10 and Comparative Example 1

Nine kinds of honeycomb structures were produced in the same manner as in Example 1 except that thickness of the outer peripheral coat layers was changed as shown in Table 1.

(Evaluation)

The honeycomb structures obtained in Examples and Comparative Examples were put in furnaces heated at 7 kinds of set temperatures shown in Table 7 and kept for one hour until the interior of each of the honeycomb structure had the set temperature. Then, the honeycomb structures were taken out and observed to confirm presence/absence of a crack generated due to the difference in thickness depending on portions of the outer peripheral coat layer. In the crack evaluation, "good" was given to the case of no crack, and "bad" was given to the case of having a crack. The results are shown in Table 1. In Comparative Example 1 (the case of $t_1=t_2$ and $t_3=t_4$), a crack was generated when the set temperature was 300° C. In contrast, as in Examples 1 to 9, as thickness of $t_1$ and $t_3$ was increased to twice $t_2$ and $t_4$ or more (2 to 40 times), respectively, the set temperature where a crack was generated was high. That is, it was understood that the thicker the predetermined portions of the outer peripheral coating layer was, the more a crack generation limit was improved.

TABLE 1

| Set temperature (° C.) | Comp. Ex. 1 $t_1 = t_2$ $t_3 = t_4$ | Example 1 $t_1 = 2t_2$ $t_3 = 2t_4$ | Example 2 $t_1 = 5t_2$ $t_3 = 5t_4$ | Example 3 $t_1 = 10t_2$ $t_3 = 10t_4$ | Example 4 $t_1 = 15t_2$ $t_3 = 15t_4$ | Example 5 $t_1 = 20t_2$ $t_3 = 20t_4$ | Example 6 $t_1 = 25t_2$ $t_3 = 25t_4$ | Example 7 $t_1 = 30t_2$ $t_3 = 30t_4$ | Example 8 $t_1 = 35t_2$ $t_3 = 35t_4$ | Example 9 $t_1 = 40t_2$ $t_3 = 40t_4$ |
| --- | --- | --- | --- | --- | --- | --- | --- | --- | --- | --- |
| 200 | Good | Good | Good | Good | Good | Good | Good | Good | Good | Good |
| 250 | Good | Good | Good | Good | Good | Good | Good | Good | Good | Good |
| 300 | Bad | Good | Good | Good | Good | Good | Good | Good | Good | Good |
| 350 | Bad | Bad | Bad | Bad | Good | Good | Good | Good | Good | Good |
| 400 | Bad | Bad | Bad | Bad | Bad | Bad | Good | Good | Good | Good |
| 450 | Bad | Bad | Bad | Bad | Bad | Bad | Bad | Good | Good | Good |
| 500 | Bad | Bad | Bad | Bad | Bad | Bad | Bad | Bad | Good | Good |
| 550 | Bad | Bad | Bad | Bad | Bad | Bad | Bad | Bad | Bad | Bad |

Example 1

(Production of Honeycomb Structure)

There were produced honeycomb segments each having dimensions of 3.5 mm×3.5 mm×150 mmL, a partition wall thickness of about 300 μm (12 mil), and a cell density of about 47 cells/cm$^2$ (300 cells/in$^2$)

(Production of Honeycomb Structure)

A slurried bonding material was applied on the honeycomb segments to join the honeycomb segments together and dried and cured to produce a honeycomb segment joined body, which was then ground. Then, a slurried outer peripheral coat material was applied to form an outer peripheral coat layer. Thus, a columnar honeycomb structure for a DPF having a diameter of 144 mm and a length of 152 mm was produced. In

INDUSTRIAL APPLICABILITY

A honeycomb structure of the present invention is useful as a diesel particulate filter (DPF) for trapping and removing particulate matter contained in Exhaust gas from, for example, a diesel engine as a trapping filter for exhaust gas.

What is claimed is:

1. A honeycomb structure comprising:
   a honeycomb segment joined body comprising a plurality of honeycomb segments unitarily joined at joint faces thereof by means of a bonding material layer, and
   an outer peripheral coat layer covering an outer peripheral surface of said honeycomb segment joined body, the honeycomb structure having a plurality of cells functioning as fluid passages disposed in parallel with one another in a central axis direction;

wherein a thickness of one portion of said outer peripheral coat layer located on end faces in longitudinal direction of the bonding material layer in a cross-section in a direction perpendicular to the central axis direction is larger than an average thickness of a first remainder of said outer peripheral coat layer;

wherein the one portion is located on the end faces of said outer peripheral coat layer; and wherein a maximum thickness ($t_1$) in a portion (maximum portion) having the maximum thickness of said outer peripheral coat layer and the average thickness ($t_2$) in a second remainder of said outer peripheral coat layer satisfy the relation of $(t_1) > 20 \times (t_2)$.

2. A honeycomb structure according to claim 1, wherein the maximum thickness ($t_1$) in the portion (maximum portion) having the maximum thickness and the average thickness ($t_2$) in the second remainder of said outer peripheral coat layer satisfy the relation of $20 \times (t_2) < (t_1) \leq 40 \times (t_2)$.

3. A honeycomb structure according to claim 1, wherein a thickness ($t_3$) of said outer peripheral coat layer at the four portions (portions on end faces in 90° directions) located in 90° direction with one another on end faces in longitudinal direction of the bonding material layer in a cross-section in a direction perpendicular to the central axis direction and the average thickness ($t_4$) in a third remainder of said outer peripheral coat layer satisfy the relation of $20 \times (t_3) < (t_4) \leq 40 (t_3)$.

4. A honeycomb structure according to claim 1, wherein a cross-section, in a direction perpendicular to the central axis direction, of the honeycomb segments has a rectangular shape.

5. A honeycomb structure according to claim 1, wherein a cross-section, in a direction perpendicular to the central axis direction, of the honeycomb segment joined body has a shape of a circle, an ellipse, or a racetrack.

6. A honeycomb structure according to claim 1, wherein the honeycomb segments constituting the outermost periphery of the honeycomb structure do not have a crust having a pitch of 7 cells or more.

* * * * *